(12) United States Patent
Klank et al.

(10) Patent No.: US 8,179,128 B2
(45) Date of Patent: May 15, 2012

(54) WHEEL SUSPENSION FOR A VEHICLE

(75) Inventors: Michael Klank, Osnabruck (DE);
Andreas Gartner, Bremen (DE)

(73) Assignee: ZF Friedrichshafen AG,
Friedrichshafen (DE)

( * ) Notice: Subject to any disclaimer, the term of this
patent is extended or adjusted under 35
U.S.C. 154(b) by 416 days.

(21) Appl. No.: 12/519,672

(22) PCT Filed: Dec. 17, 2007

(86) PCT No.: PCT/DE2007/002269
§ 371 (c)(1),
(2), (4) Date: Jun. 17, 2009

(87) PCT Pub. No.: WO2008/074309
PCT Pub. Date: Jun. 26, 2008

(65) Prior Publication Data
US 2010/0013173 A1    Jan. 21, 2010

(30) Foreign Application Priority Data
Dec. 21, 2006  (DE) .................. 10 2006 061 976

(51) Int. Cl.
*G01B 7/30*    (2006.01)

(52) U.S. Cl. .................. 324/207.25; 324/179
(58) Field of Classification Search ............. 324/207.25, 324/179
See application file for complete search history.

(56) References Cited

U.S. PATENT DOCUMENTS

| 4,978,848 | A | 12/1990 | Hiwatashi et al. | |
|---|---|---|---|---|
| 5,321,355 | A | * | 6/1994 | Luetzow .................... 324/207.2 |
| 6,126,177 | A | 10/2000 | Steinert | |
| 7,045,999 | B2 | 5/2006 | Ersoy et al. | |
| 2005/0000772 | A1 | * | 1/2005 | Wohner .................... 192/30 W |
| 2005/0068024 | A1 | * | 3/2005 | Byram ................... 324/207.25 |
| 2006/0213288 | A1 | * | 9/2006 | Suzuki .................... 73/862.321 |
| 2006/0220638 | A1 | 10/2006 | Urquidi et al. | |
| 2008/0165828 | A1 | * | 7/2008 | Seki et al. ..................... 374/208 |

FOREIGN PATENT DOCUMENTS

| DE | 44 29 856 C1 | 9/1995 |
|---|---|---|
| DE | 44 29 859 C1 | 9/1995 |
| DE | 102 21 873 A1 | 11/2003 |
| EP | 0 972 660 A1 | 6/1999 |
| EP | 1 707 922 A1 | 3/2006 |
| GB | 2 217 837 A | 11/1989 |
| GB | 2 229 006 A | 9/1990 |
| GB | 2 292 614 A | 2/1996 |

* cited by examiner

*Primary Examiner* — Bot Ledynh
(74) *Attorney, Agent, or Firm* — Davis & Bujold, P.L.L.C.

(57) ABSTRACT

A wheel suspension for a vehicle which includes a wheel (8) and at least one suspension arm (2) that connects the wheel (8) to the body (7) of the vehicle. The arm (2) is pivotally mounted to the body (7) by an inner part (9) of a bearing (3) such that the arm (2) pivots about an axis (6). An angle measuring device senses rotation of the arm (2) about the pivot axis (6) relative to the body (7) and includes a signal generator (25) and a sensor (18). One of the signal generator (25) and the sensor (18) is attached to an outside of the arm (2) while the other is rigidly attached, via a bracket (15), to the body (7) at a distance from the suspension arm (2).

8 Claims, 5 Drawing Sheets

WHEEL SUSPENSION FOR A VEHICLE

This application is a National Stage completion of PCT/DE2007/002269 filed Dec. 17, 2007, which claims priority from German patent application serial no. 10 2006 061 976.5 filed Dec. 21, 2006.

FIELD OF THE INVENTION

The invention concerns a wheel suspension for a vehicle, comprising a body, a wheel, at least one suspension arm, through which the wheel is connected to the body, a bearing, through which the body-mounted suspension arm can be swiveled at least around one pivot axis, the bearing's inner part being attached to the body, and an angle measurement device, through which the suspension arm's rotation around the pivot axis and relative to the body, can be obtained, whereby the angle measuring device comprises a designated component functioning as a signal generator, and a component functioning as a sensor. In addition, the invention concerns a vehicle comprising such wheel suspension.

BACKGROUND OF THE INVENTION

For sensing the vehicle's front axle height position, angle sensors integrated in ball joints have been developed. These are, as compared to commonly used height position sensors, distinctly more robust, produce a better signal quality, and are more cost efficient. For the vehicle's rear axle, in most vehicles ball joints are uncommon, methods for measuring the height distance, residing in a rubber bearing, have been to developed in the past. These measurement methods, however, have several disadvantages. For instance, the bearing's rubber enclosure needs to have magnets inserted into it, which results in the enlargement of the bearing's size. In addition, additional costs will occur, due to the use of the plastic enclosed magnets, special applied magnetizing, magnet sensitive sensors, external amplifiers and controllers, as compared to using angle sensors inside the ball joint.

Through DE 102 21 873 A1, a rubber bearing with a deflection sensor is known, which comprises an inner ring, an outer ring, and has arranged in between these a rubber ring. At the outer ring, a Hall-Sensor is attached through a bracket, placed between two magnets, and which is attached to the inner ring by way of a mounting part. When the inner ring turns in relation to the outer ring, which correlates to either a deflection or a hopping, the Hall-Sensor moves towards either the left or right magnet, whereby the Hall-Sensor's surrounding magnetic field changes. The change of the magnetic field is then detected by a following electronic circuit.

The EP 1 707 922 A1 describes a sleeve bearing with an outside bushing, an inner bushing and, positioned in between these is an elastomeric body. The elastomeric body is a two-part unit, with a permanent magnet and a galvano magnetic sensor positioned in the gap between the two elastomeric body parts, magnetically connected in series and rigidly linked with the inner bushing. In addition, the gap contains a magnetically conducting ring which surrounds the magnetic series connection and is placed in such a way, that an air gap exists on both sides. The shape of the ring is such that an outer bushing's torsion, in relationship to the inner bushing, will create a change of the air gap's length. By means of a sleeve bearing, a suspension arm with the associated wheel is pivotally connected to the vehicle's body.

The disadvantage of this design is the need to insert magnets and or sensors into the bearing's rubber material, which results in the enlargement of the needed space of the actual bearing and, by comparison, a more sophisticated manufacturing.

In addition, DE 44 29 856 C1 discloses a vehicle's wheel suspension, comprising a body, a wheel, at least one suspension arm, through which the wheel is connected to the body, a bearing, through which the suspension arm can be pivoted at least in one axis at the body, at which a bearing's inner part is mounted. Also, an angle measuring device is present, through which pivoting of the suspension arm's pivot axle, relative to the body, can be measured. The angle measuring device comprises a component, designed as a signal generator (6a), and a component serving as a sensor. The angle measuring device, including the signal generator and sensor, are mounted on the suspension arm's side, which not only causes the configuration to be unfavorably wider, but it also requires that an additional, external leaf spring component, for driving and clamping the sensor.

SUMMARY OF THE INVENTION

Based on the prior art, the invention's objective is to further improve a wheel suspension, currently known in the previously described art, in such a way that the bearing is affected as little as possible by the angle measurement device.

The wheel suspension according to the invention is for a vehicle, particularly an automobile, and comprises a vehicle's body, a wheel, at least one suspension arm, through which the wheel is connected with the body, a bearing, through which the suspension arm, is pivotally mounted to the body, in at least one pivot axis, at which a bearing's inner part is mounted in a rotationally fixed manner, and a angle measurement device, through which a suspension arm's rotation, about the pivot axis and in relationship to the body, is ascertainable, whereby the angle measurement device comprises a component designed as signal generator, and a component designed as sensor, with one of the components is mounted at the suspension arm's outer side, and the other component is being mounted at a stationary position in relationship to the body, at a distance to the suspension arm. In addition, the signal generator is mounted on the suspension arm's outer surface and the sensor is mounted in very close proximity to the signal generator.

In this wheel suspension, in accordance with the invention, the signal generator, as well as the sensor, are positioned external to the bearing, so that it does not have to be matched with the sensor configuration. Therefore, it is possible to use an elastomeric bearing or a rubber bearing as a bearing, and it does not require an integrated sensor configuration. The signal generator is hereby especially interacting or can be interacting in a way, such that the sensor provides a particular electric signal, or is modifying this signal, which represents or indicates the slew angle or the suspension arm's pivot angle around the pivot axis.

Due to the fact that magnetic angle measurement devices in wheel suspensions are field proven, the signal generator is designed preferably as a magnet, and the sensor is designed as sensitive to magnetism or as magnet sensor. Particularly, the signal generator is designed as a permanent magnet, so that the signal generator does not have to be attached to an electric wire harness. Alternatively however, the signal generator can also be designed as an electro magnet.

The magnet is furnished, preferably, with a plastic jacket, which will protect it from environmental factors. If the plastic jacket is large enough in size, it is possible to attach the magnet through the plastic jacket to the suspension arm, particularly being riveted. Additionally or alternatively, it is possible, for example, to glue the magnet and/or the plastic jacket to the suspension arm.

The bracket is constructed from sheet metal and is preferably equipped with a slot, the sensor's enclosure has at least one notch, which interconnects with the slot's edge. Preferably, the enclosure is equipped with two, opposed, notches, or is designed with a circular or a partially circular notch, so that two opposing slot's edges are interconnecting with the notch or notches. The width of the notch or notches is particularly smaller than the sheet metal's thickness, so that the sensor's enclosure is rigidly attached to the sheet metal to prevent unwanted shifting along the slot is being prevented. That way, the sensor is attached or detached, in a simple manner, to and from the bracket. It is preferred to attach the bracket to the body and can proceed, combined with the slot, in steps. Herewith, it is possible to insert the sensor and its housing, in the step's area, into the slot.

According to a variation, the bracket is attached to the inner part. For this purpose, the bracket comprises two sides, between which the inner part is located, whereby the sensor is positioned at the bracket's bottom, which connects the two sides. Preferably, the bracket is mounted in a rotationally fixed manner at the inner part. In particular, at least one of the sides is designed with an edge, that interconnects with a notch provided at the inner part. The interconnection of the notch and the edge prevent the bracket from rotating.

The bearing can be designed as sleeve bearing, as a ball sleeve joint, or any other bearing or joint, and is preferably designed as an elastomeric bearing or as a rubber bearing. The bearing features an inner part which is surrounded by the outer part, which, for instance, is formed by the suspension arm or is positioned in the suspension arm's notch, whereby, an elastomeric body is positioned between the outer part and the inner part. Hereby, the outer part and inner part can be linked, having the elastomer body positioned between them. The outer part, in particular, is linked in a rotationally fixed manner with the suspension arm and forms a shallow cylinder outer sleeve. In addition, the inner part may be designed to comprise a continuous notch, and/or be configured as a ball socket or as a cylinder, inner sleeve. The outer part, in particular and with respect to the inner part, can pivot around the pivot axis. By having an elastomeric body positioned therebetween, pivoting can be achieved through deformation of the elastomeric body.

According to an embodiment of the invention, the magnet is positioned at the suspension rod's section of the suspension arm which is close to the vehicle's body, the magnet, for protection purposes, is enclosed in a plastic wrapper. The magnet can be glued to the suspension arm or, if using a larger plastic part or a larger plastic wrapper, respectively, can be riveted. The magnetic field sensitive sensor is connected to the suspension arm's bottom area through a retaining sheet metal plate, meaning that the retaining sheet metal plate is either rigidly linked with the inner sleeve, via form clamping or power clamping, or, alternatively, is linked with the sub-frame or the auxiliary frame, respectively.

Due to the fact that the same sensor, in this invention, can be utilized as ball joints, the sensor becomes less costly, due to the quantity effect. In accordance with the bearing's embodiment and being designed as rubber bearing, there is no need to modify it and the needed mounting space is nearly the same. The retaining plate's characteristics allows easy sensor replacement if it is damaged.

Within a certain distance between the magnet and the sensor, the correlation between the sensor's measurement signal being provided and the suspension's rotation angle around the pivot axle is linear. In case the suspension arm is distanced from the wheel, when providing the connection through a bearing or rubber bearing, and the magnet's center point is located at the extension of the axis which extends through both of the rubber joint's center points, the suspension arm's rotation around the axis (Kardanik) has no effect on the sensor's signal (axis of symmetry). Tests have demonstrated that torsion around a vertically positioned axis, in relation to the symmetric axis, which is positioned as being parallel to the vehicle's vertical axis, generates almost no change of the sensor's signal. Impact due to changes of proximity between the magnet and the sensor during the vehicle's operation was not noticeable.

The invention further pertains to a vehicle, in particular an automobile, comprising a body and at least one suspension arm. The vehicle's suspension arm being the inventive suspension arm and can be configured in accordance with all listed embodiments. In particular, the suspension arm's configuration is a result of the vehicle's body, or it is determined by the vehicle body's auxiliary frame or suspension sub-frame. Through the angle measuring device, the wheel's deflection is preferably determined in comparison with the vehicle's body.

The vehicle comprises a front axle and a rear axle, with the at least one wheel suspension being positioned at the rear axle. At least one wheel suspension's arm guide rod is hinged to either the vehicle's body, the auxiliary frame, or to the sub-frame. The suspension's arm, in particular, is designed as a suspension rod.

BRIEF DESCRIPTION OF THE DRAWINGS

The invention is described hereinafter by referring to the preferred embodiments in the drawings, in which.

DETAILED DESCRIPTION OF THE PREFERRED EMBODIMENTS

Figure 1:
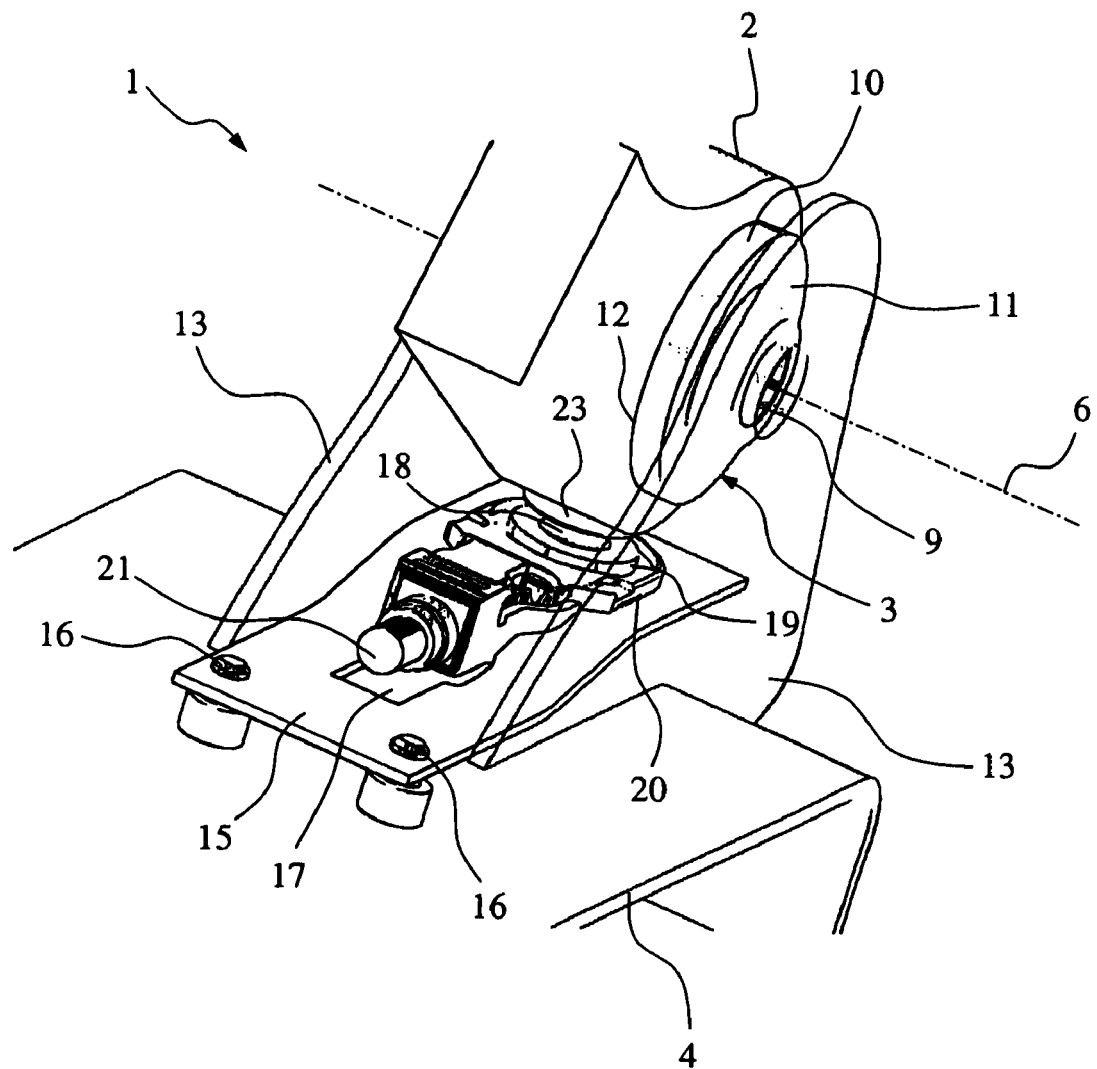
FIG. 1 is a perspective view of a wheel suspension in accordance with a first embodiment of the invention.
Figure 8:
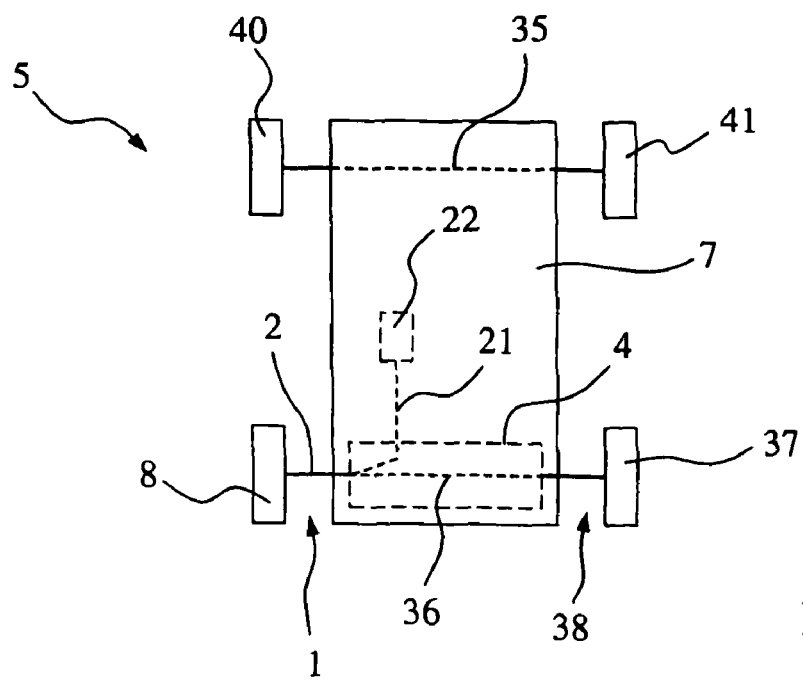
FIG. 8 is a schematic top view of an automobile comprising the invention's embodiment of the wheel suspension, in particular the first embodiment.

FIG. 1 represents a perspective partial view of a wheel suspension 1, in accordance with the invention's first embodiment, a suspension arm 2, is pivotally coupled by means of the elastomeric bearing 3, to an auxiliary frame 4 of an automobile 5 (see FIG. 8). Through the elastomeric bearing 3, the suspension arm 2 is pivoted around the pivot axis 6, in relation to the auxiliary frame 4, which is rigidly connected to the body 7 of the vehicle 5 (see FIG. 8). Therefore, the suspension arm 2 pivots around the pivot axis 6, relative to the vehicle's body 7. The auxiliary frame 4 is apportioned to the vehicle's body 7, with a suspension sub-frame being used instead of an auxiliary frame. It is possible, as an alternative, to operate the suspension arm 2, by means of the elastomeric bearing 3, without utilizing an auxiliary frame or sub-frame to interconnect with the vehicle's body 7.

The one end of suspension arm 2, not visible in FIG. 1, is linked to the vehicle wheel 8 (see FIG. 8). The suspension arm 2 is pivoted, by means of a joint or elastomeric bearing, to a knuckle, at which the vehicle's wheel 8 is pivotally mounted.

The elastomeric bearing 3 comprises an inner part 9 and an outer part 10, which surrounds the inner part 9, with an elastomer body 11 being positioned between the inner part 9 and the outer part 10. The outer part 10 is positioned in a rotationally fixed manner in the hollow 12 of the suspension arm 2, while the inner part 9 is positioned between and linked to two, sheet metal supports 13 of the auxiliary frame 4 in a rotationally fixed manner. The inner part 9, in particular, is provided with a continuous hollow or bore hole, into which a bolt is inserted all the way through, to locking the elastomeric bearing 3 and the auxiliary frame 4 with the sheet metal supports 13.

Attached to the auxiliary frame 4 is a bracket 15 by means of screws or rivets 16, and the bracket 15 is formed with sheet metal and has a slot 17. The sheet metal bracket 15 is bent in a step pattern, so that the slot 17 also has a step pattern. A magnetic-sensitive sensor 18 is attached to the bracket 15, and is positioned in an enclosure 19, having a partially, circulatory channel 20, which the sheet metal 15 cuts into with the edges of the slot. During assembly, the sensor 18 can be inserted, into the stepped area, of the slot 17. Thereby, the sensor 18 can again be removed from the bracket 15 and exchanged in the event of damage. The sensor 18 is, by means of one or several electrical conductors 21, connected to an electronic analyzer unit 22 (see FIG. 8), through which the electronic information, received from the sensor 18, can be processed.

Figure 2:
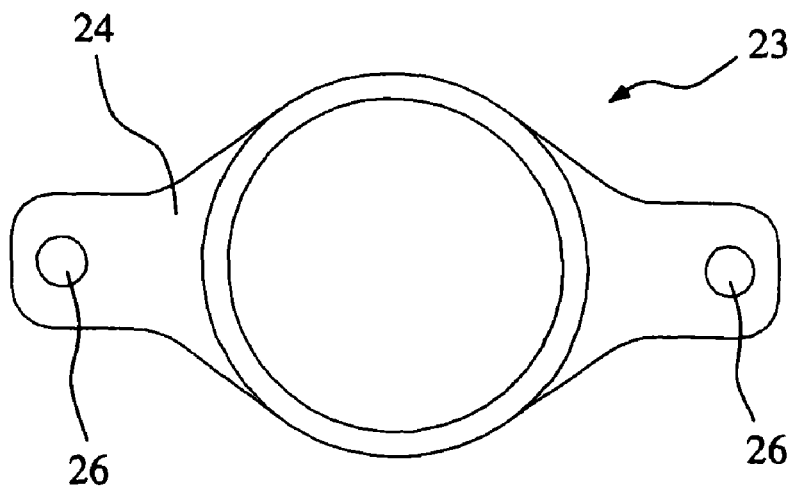
FIG. 2 is a top view of a magnet configuration, in accordance with the first embodiment.
Figure 3:
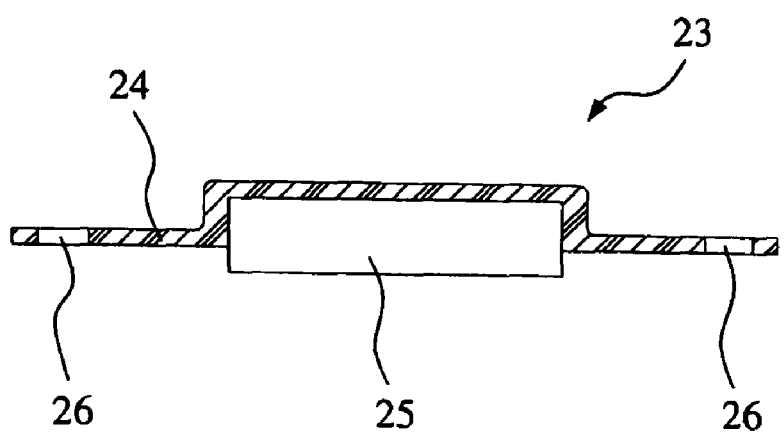
FIG. 3 is a cross section of the magnet configuration.

At the outer surface of the suspension arm 2, in the area of sensor 18, a magnet assembly 23 is attached, which incorporates a permanent magnet 25, equipped with a plastic casing 24 (see FIG. 3). As shown in FIG. 2, the plastic casing 24 comprises two through holes 26, through which the suspension arm's 2 rivets pass, when assembled, to fasten the magnet configuration 23 with respect to the suspension arm 2. Alternatively or in addition, the plastic casing 24 and/or the magnet 25 can be glued to the suspension arm 2, or being attached in a different manner. The magnet's 25 magnetic field varies at the location of sensor 18, depending on the rotation of the suspension arm 2, around the pivot axis 6, with this variation being captured by the sensor 18. The sensor 18, particularly, operates as a configuration of hall elements, based on the Vertical-Hall principle.

Figure 7:
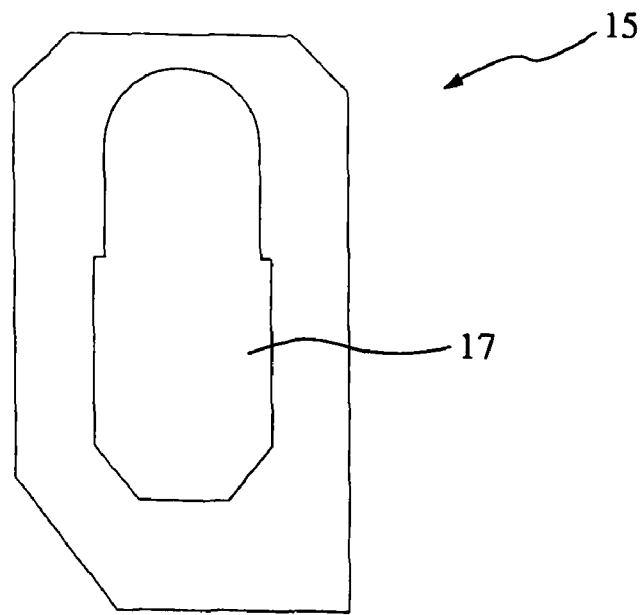
FIG. 7 is a top view of a variation of the bracket in accordance with the first embodiment.

FIG. 7 shows a top view of a variation of the bracket 15, in accordance with the first embodiment. This bracket 15 is also formed with sheet metal and features a slot 17, so that the variation shown in FIG. 7 can be used instead of the bracket 15, shown in FIG. 1.

Figure 4:
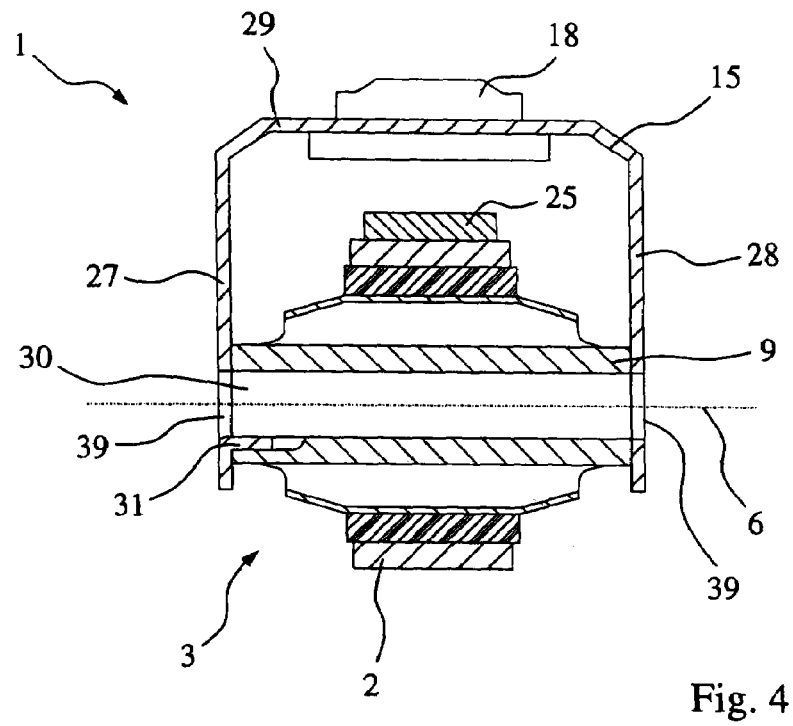
FIG. 4 is a partial cross section of a wheel suspension in accordance with a second embodiment of the invention.
Figure 5:
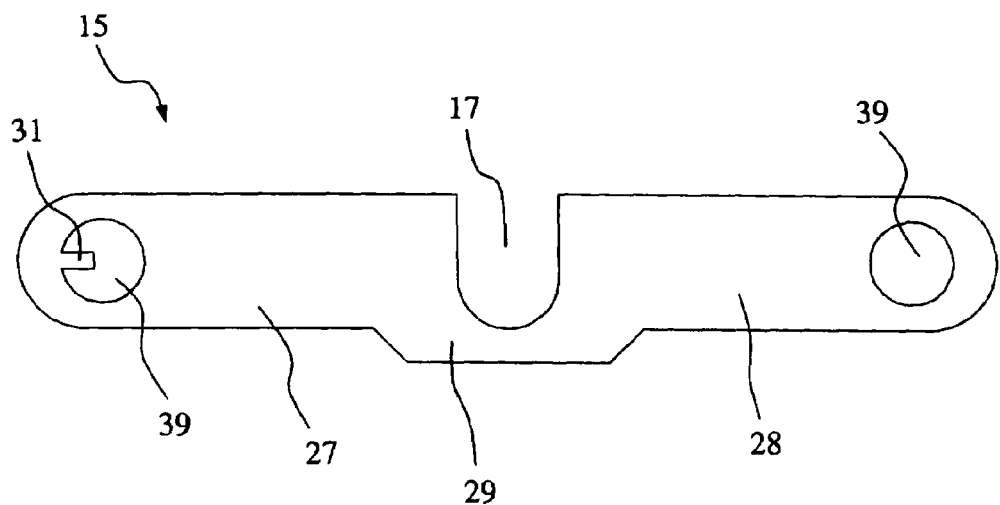
FIG. 5 is a top view of a bracket, in accordance with the second embodiment, before installation.

Shown in FIG. 4 is, a partial section view of a wheel suspension 1 in accordance with the invention's second embodiment, and similar or identical characteristics shown in the first embodiment, have the same reference characters as those shown in the first embodiment. At the inner part 9 of the bearing 3, a bracket 15 is attached, and in accordance with the second embodiment is designed in a U-shape form, and comprises two parallel sides 27 and 28, which are connected together via the base 29. In addition, the bracket 15 features a slot 17 (see FIG. 5), into which the magnetic field sensitive sensor 18 is inserted and consequently fixed to the bracket 15. The sensor 18 operates, in a similar manner, as the first embodiment, in conjunction with the permanent magnet 25, which is attached to the outer surface of the suspension arm 2. The bracket 15 comprises two through holes 39 through which in a completely assembled condition, a bolt is inserted into the holes 39 and into the hollow of the inner part 9, or through bore hole 30, such that the inner part 9 is attached in a rotationally fixed manner to the auxiliary frame 4. To further ensure that the bracket 15 is attached in a rotationally fixed manner, in relation to the inner part 9, a lug 31 is provided at the side 27 in the area of the bore hole 39, which either interconnects at or in the inner part's 9 notch or inner notch, thus preventing a rotation. A top view of this bracket 15, prior to the assembly, is presented in FIG. 5, where the two sides 27 and 28 have not been bent in relation to the base 29. In addition, the lug 31, as in FIG. 5, has not been bent from the side 27.

Figure 6:
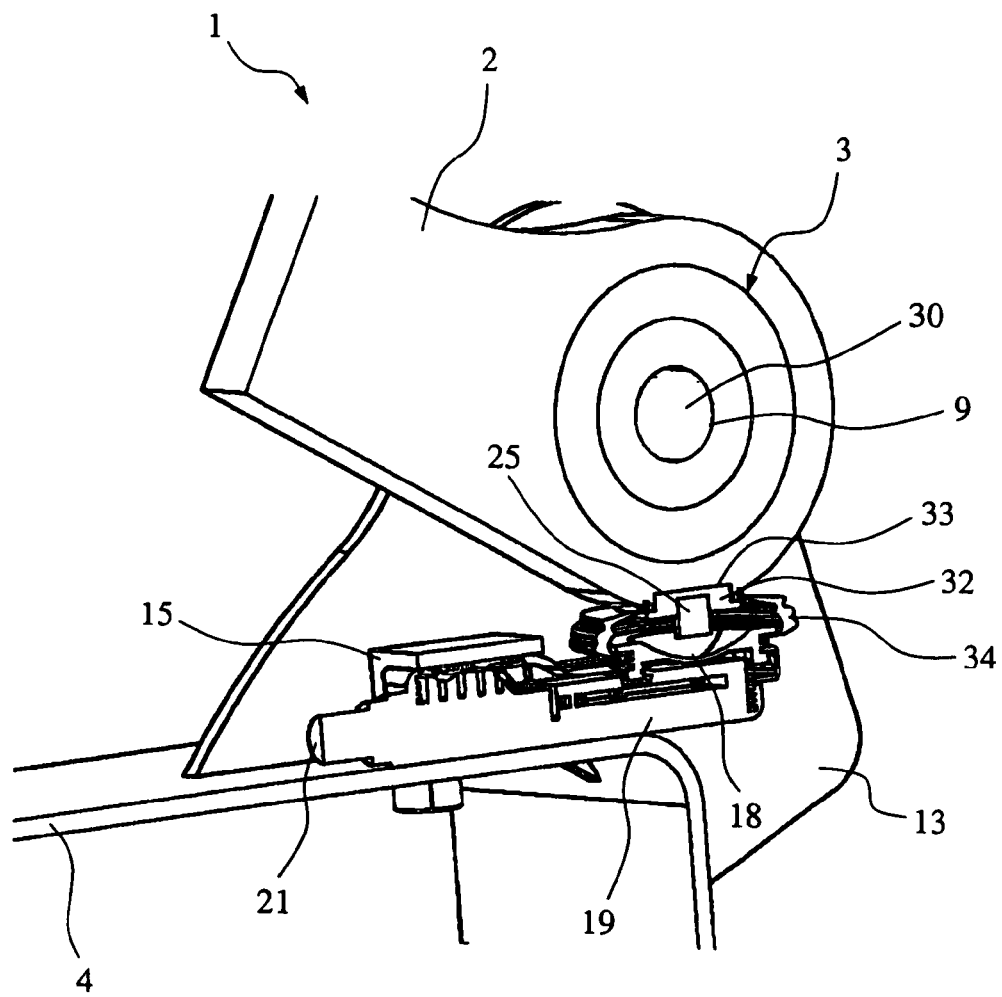
FIG. 6 is a partial perspective view of a wheel suspension in accordance with a third embodiment of the invention.

A partial perspective, view of a wheel suspension in accordance with the third embodiment is presented in FIG. 6, wherein identical or similar characteristics, when compared to the first embodiment, have been assigned with the same reference numerals as in the first embodiment. The permanent magnet 25 is positioned, by means of a body 32, in the notch 33 of the suspension arm 2 and, contrary to the first embodiment, is not covered by a plastic casing. In fact, the permanent magnet 25 is seated in the inner area of a sealing boot 34, which extends from the body 32 to the enclosure 19 of sensor 18. The sensor 18, or the sensor enclosure 19, respectively, are positioned directly on the auxiliary frame 4, and attached thereto by means of a bent bracket 15, which is screwed on to the auxiliary frame 4.

In FIG. 8, a schematic top view of an automobile 5 is shown, which comprises a front axle 35, having two wheels 40, 41, and a rear axle 36, which is configured with the wheel suspension 1, in accordance with the invention. A second wheel 37 of the rear axle 36 is also connected, through the inventive wheel suspension 38, with the vehicle body 7, which is preferably configured in accordance with the wheel suspension 1. Although the vehicle 5, as in FIG. 8, is being decisively described by referencing the first embodiment, all the invention's embodiments can be applied to vehicle 5.

DESIGNATION CHARACTER LIST FOR THE DRAWINGS

1 Wheel Suspension
2 Suspension Arm
3 Bearing
4 Auxiliary Frame
5 Automobile
6 Suspension Arm's Pivot Axis
7 Vehicle Body
8 Wheel
9 Inner Part of Bearing
10 Outer Part of Bearing
11 Bearing's Elastomeric Body
12 Hollow in Suspension Arm
13 Sheet Metal Support
15 Bracket
16 Screw or Rivet
17 Slot
18 Sensor
19 Sensor Enclosure
20 Channel in Sensor Enclosure
21 Electrical Conductor(s)
22 Electronic Analyzer
23 Magnet Assembly
24 Plastic Casing
25 Permanent Magnet
26 Through Hole in Plastic Casing
27 Side of Bracket 28 Side of Bracket
29 Base of Bracket
30 Bore Hole, Inner Part
31 Bracket Lug
32 Body
33 Notch in Suspension Arm
34 Gasket Boot
35 Vehicle Front Axle
36 Vehicle Rear Axle
37 Wheel
38 Wheel Suspension
39 Bore Hole in Bracket
40 Wheel
41 Wheel

The invention claimed is:

1. A vehicle wheel suspension comprising:
a body (7),
a wheel (8),
at least one suspension arm (2) by which the wheel (8) being connected to the body (7),
a bearing (3) by which, about at least around one pivot axis (6), the suspension arm (2) is pivotally mounted to the body (7) via an inner part (9) of the bearing (3),
an angle measurement device by which rotation of the suspension arm (2), around pivot axis (6) relative to the body (7), is ascertainable, and the angle measurement device comprises a signal generator (25) and a sensor (18),
the sensor (18) being attached to a bracket (15) which is rigidly fixed to the body (7) and the sensor (18) being spaced from the suspension arm (2),
the signal generator (25) being mounted on an outer surface of the suspension arm (2) and radially spaced from the pivot axis (6) by a first distance and the sensor (18) being positioned radially spaced from the pivot axis (6) by a second distance in close proximity of the signal generator (25), the second distance being greater than the first distance, and
the bracket (15) having a cavity (17) with a lug and the sensor (18) being secured, via an enclosure (19) having at least one notch (20), and the lug of the bracket (15) engaging the notch (20) to connect the enclosure (19) with the bracket (15).

2. The wheel suspension according to claim 1, wherein the signal generator (25) is a magnet and the sensor (18) is a magnetic field sensitive sensor.

3. The wheel suspension according to claim 2, wherein the magnet (25) has a plastic casing (24) which is one of glued and riveted to the suspension arm (2).

4. The wheel suspension according to claim 1, wherein the bracket (15) and the cavity (17) have a stepped pattern and are rigidly fixed to the body (7).

5. The wheel suspension according to claim 1, wherein the bracket (15) has two sides (27, 28) which are coupled to each other by a base (29), and the suspension arm (2) is supported by the bearing (3) which is secured between the two sides (27, 28) of the bracket (15) such that the suspension arm (2) pivots about the pivot axis (6) between the two sides (27, 28) of the bracket (15), and the sensor (18) is fixed to the base (29) of the bracket (15) such that the sensor (18), the signal generator (25) and the suspension arm (2) define a rotational plane which is normal to the pivot axis (6).

6. A vehicle wheel suspension comprising:
a body (7),
a wheel (8),
at least one suspension arm (2) by which the wheel (8) being connected to the body (7),
a bearing (3) by which, about at least around one pivot axis (6), the suspension arm (2) is pivotally mounted to the body (7) via an inner part (9) of the bearing (3),
an angle measurement device by which rotation of the suspension arm (2), around pivot axis (6) relative to the body (7), is ascertainable, and the angle measurement device comprises a signal generator (25) and a sensor (18),
the sensor (18) being attached to a bracket (15) which is rigidly fixed to the body (7) and the sensor (18) being spaced from the suspension arm (2), and
the signal generator (25) being mounted on an outer surface of the suspension arm (2) and radially spaced from the pivot axis (6) by a first distance, and the sensor (18) being positioned radially spaced from the pivot axis (6) by a second distance in close proximity of the signal generator (25), and the second distance being greater than the first distance,
wherein the inner part (9) of the bearing (3) is surrounded an outer part (10) which is either formed by the suspension arm (2) or is positioned in a hollow (12) of the suspension arm (2), and an elastomeric body (11) is positioned between the outer part (10) and the inner part (9).

7. A vehicle having a vehicle wheel suspension comprising:
a body (7),
a wheel (8),
at least one suspension arm (2) by which the wheel (8) is connected to the body (7),
a bearing (3) by which the suspension arm (2) is pivotally mounted to the body (7) about a pivot axis (6), and an angle measurement device being mounted to an inner part (9) of the bearing (3) via which rotation of the suspension arm (2), about the pivot axis (6) relative to the body (7), is determined, the angle measurement device comprises a signal generator (25) and a sensor (18), one of the signal generator (25) and the sensor (18) being attached to an outer surface of the suspension arm (2) and another of the signal generator (25) and the sensor (18) being attached to a bracket (15) which is rigidly fixed to the body (7) at a distance from the suspension arm (2), the signal generator (25) is mounted on an outer surface of the suspension arm (2) at a radial distance from the pivot axis (6) and the sensor (18) is positioned in close proximity of the signal generator (25) at a greater radial distance from the pivot axis (6) than the signal generator (25);
the bracket (15) has two sides (27, 28) which are coupled to each other by a base (29), the suspension arm (2) is supported between the two sides (27, 28) of the bracket (15) by the bearing (3), the sensor (18) is rigidly fixed to the base (29) of the bracket (15) such that the sensor (18), the signal generator (25) and the suspension arm (2) are aligned with respect to each other and define a rotational plane which is normal to the pivot axis (6), the signal generator (25) and the suspension arm (2) rotate in the rotational plane, and
the vehicle wheel suspension is connected to an auxiliary frame (4) which forms at least a portion of the body (7) of the vehicle.

8. The vehicle having the vehicle wheel suspension according to claim 7, further comprising a front axle (35) and a rear axle (36), and the vehicle wheel suspension (1) communicates with the rear axle (36) and the suspension arm (2) is a guide rod.

* * * * *